United States Patent [19]

Maier et al.

[11] Patent Number: 5,569,479
[45] Date of Patent: Oct. 29, 1996

[54] PROCESS FOR AGGLOMERATING POWDER-FORM MATERIALS

[75] Inventors: Hanspeter Maier, Moerfelden; Klaus Zimmermann, Kornwestheim, both of Germany

[73] Assignee: Nestec S.A., Vevey, Switzerland

[21] Appl. No.: 388,362

[22] Filed: Feb. 14, 1995

Related U.S. Application Data

[62] Division of Ser. No. 102,853, Aug. 6, 1993, Pat. No. 5,400,972, which is a continuation of Ser. No. 678,115, Apr. 1, 1991, abandoned.

[30] Foreign Application Priority Data

May 18, 1990 [EP] European Pat. Off. .............. 90109504

[51] Int. Cl.⁶ .............................. A23F 3/32; A23F 5/12; A23F 5/38; A23B 9/08
[52] U.S. Cl. .......................... 426/453; 426/285; 426/511
[58] Field of Search ..................... 426/285, 453, 426/456, 511; 264/12, 14; 425/222; 239/418, 422, 423, 424, 427.3, 427.5, 440, 441, 450; 34/12, 174, 221, 225, 233

[56] References Cited

U.S. PATENT DOCUMENTS

| 3,443,959 | 5/1969 | Ciboit . | |
|---|---|---|---|
| 3,622,081 | 11/1971 | Marsh . | |
| 3,947,166 | 3/1976 | Kleemann et al. . | |
| 4,263,346 | 4/1981 | Sandell . | |
| 4,420,441 | 12/1983 | Singer . | |
| 4,618,100 | 10/1986 | White et al. . | |
| 4,724,620 | 2/1988 | Hsu | 34/174 |
| 4,955,546 | 9/1990 | Liaw . | |

FOREIGN PATENT DOCUMENTS 60-117258  6/1985  Japan .

OTHER PUBLICATIONS

Derwent Abstract No. 85-187713131, Derwent Publications, Ltd., London, England (1985).

Primary Examiner—Anthony J. Weier
Attorney, Agent, or Firm—Vogt & O'Donnell, LLP

[57] ABSTRACT

A powder-form particulate material is agglomerated by feeding the material to obtain a particulate material flow, and steam is fed through a sintered plate so that a flow of steam issues from the plate coaxially about the particulate material flow and a flow of a gas is fed coaxially to and between the particulate material flow and the steam flow so that the particulate material is contacted with steam to wet and agglomerate the particulate material.

17 Claims, 5 Drawing Sheets

PROCESS FOR AGGLOMERATING POWDER-FORM MATERIALS

CROSS REFERENCE TO RELATED APPLICATIONS

This application is a divisional application of application Ser. No. 08/102,853, filed Aug. 6, 1993, which is now U.S. Pat. No. 5,400,972 and which was, in turn, a continuation application of application Ser. No. 07/678,115, filed Apr. 1, 1991, and abandoned.

BACKGROUND OF THE INVENTION

This invention relates to a process for agglomerating a soluble, powder-form material.

Powder-form products, such as soluble or instant coffee, are usually agglomerated to improve the wettability and of the particles and to increase the average particle diameter. The material to be agglomerated is exposed to the effect of a powerful high-velocity jet of steam. The surfaces of the particles usually have to be thoroughly wetted by the steam to obtain satisfactory agglomeration or a satisfactory surface structure. European Patent Application Publication No. 207 384 describes a process and an apparatus for agglomerating and improving the surface structure of powder-form material. In this known apparatus, however, the wetting zone is not long enough to obtain good agglomeration or darkening, in addition to which the apparatus can clog up after a relatively short period of operation.

SUMMARY OF THE INVENTION

The problem addressed by the present invention was to provide an improved process for treating a soluble, powder-form material, in which the particles are wetted in a long zone, the risk of clogging is minimized and the agglomerate obtained shows improved instant properties and surface properties.

In the present invention, a powder-form particulate material is agglomerated by feeding the material to obtain a particulate material flow and feeding steam through a sintered plate so that a flow of steam issues from the plate coaxially about the particulate material flow and feeding a flow of a gas coaxially to and between the particulate material flow and the steam flow so that the particulate material is contacted with steam to wet and agglomerate the particulate material. A further embodiment of the process includes feeding an additional steam flow and feeding the particulate material flow so that the particulate material flow is coaxial about the additional steam flow.

In the process according to the invention, the centrally flowing powder-form material is wetted by two gas streams coaxial thereto in a downstream direction, at least the outer gas stream being steam. The inner gas stream is air or steam. The inner gas stream may have a velocity which is equal to or faster than the outer gas stream, the difference in velocity being dependent on the throughput and type of product; the higher the product throughput, the higher the velocity ratio of the inner gas stream to the outer gas stream. This ratio is between 1:1 and 8:1. The function of the outer gas stream is to ensure that the flow of powder remains uniform for as long as possible. The two streams bring about wetting of the particles and enable the wetting zone to be considerably lengthened so that agglomeration is improved. Another function of the outer stream is to ensure that as little secondary air as possible is drawn into the jet.

According to the invention, the inner stream of steam is thinner than the outer stream, i.e., in a cross-section as may be seen from the drawing Figures. In addition, it is linear or rotates.

DETAILED DESCRIPTION OF THE INVENTION

In the process of the invention, steam introduced is superheated or saturated steam at a temperature of 100° to 130° C. and under a pressure of 1 to 1.5 bar. In most cases, the temperature is approximately 100° C. and the pressure of the order of 1 bar. It is also possible to use wet steam which is a mist of fine water droplets in saturated steam. Other water-containing gases may also be used, consisting of mists of microscopic water droplets dispersed in gases other than steam.

The process is suitable for any powder-form materials of which the properties are to be improved in regard to flow, wettability, solubility, hardness and colour, for example powder-form foods. Powder-form foods which may be agglomerated or darkened include soluble coffee, soluble tea, soluble chicory powder, soluble cereal extract powder, milk powder, lactose and mixed beverages based on carbohydrates. Combinations of these materials may also be agglomerated or darkened.

Where the process according to the invention is adopted, the percentage of non-agglomerated powder material is lower than with conventional nozzles.

The present invention also relates to an apparatus for carrying out the process, comprising a filling tube for feeding the particulate material, characterized in that it comprises two wetting devices coaxially of the filling tube, the inner wetting device being formed by a circular gap between the tube and the outer wetting device being formed by an annular sintered metal plate and in that the opening of the filling tube for the material, the gap opening for the gas stream and the opening of the sintered metal plate for the supply of steam lie in substantially the same plane.

The apparatus may comprise one or two compartments for the supply and control of the gas stream. With a two-compartment arrangement, as disclosed and illustrated further below, the pressure and flow rate of the gas can be separately adjusted.

In the case of a single-compartment arrangement, the feed rate of the steam can be varied through the geometry of the gap opening and the porosity of the sintered metal plate.

The plate comprises a very large number of microscopic pores uniformly distributed over the entire surface of the plate. Depending on the type of sintered metal plate, the pores have an average diameter of 10 to 200 μm. The steam velocity obtained with this plate is lower than that of the gap. For example, the velocities in the gap and in the sintered metal plate are, respectively, 20 to 30 m/s and 10 m/s and lower. The opening of the gap is narrower than the width of the sintered metal plate. It is also possible to provide an additional wetting device to improve wetting of the product stream. This additional wetting device is arranged in the middle of the product stream and also has an opening in the plane mentioned above. The rate of flow through this additional nozzle is 20 to 100 m/s.

To minimize the turbulence of the gas stream, a ring with bores and baffle surfaces has to be arranged over the gap. These bores and baffle surfaces may be linear or inclined.

It is assumed that, under the conditions prevailing in the wetting zone, the particles come into contact with one another at low relative velocities over a relatively long zone, so that the probability of agglomeration is increased.

The agglomeration nozzle according to the invention may be used for several applications, namely, solely for agglomeration, for example for coffee-substitute and cocoa-based beverages, or for combined use of spray drying and agglomeration, for example for coffee extracts, or even for darkening or surface structuring of particles already present in their final size.

Preferred embodiments of the apparatus according to the invention are described in detail in the following with reference to the accompanying drawings.

DETAILED DESCRIPTION OF THE DRAWINGS AND DESCRIPTION OF PREFERRED EMBODIMENTS

Figure 3:
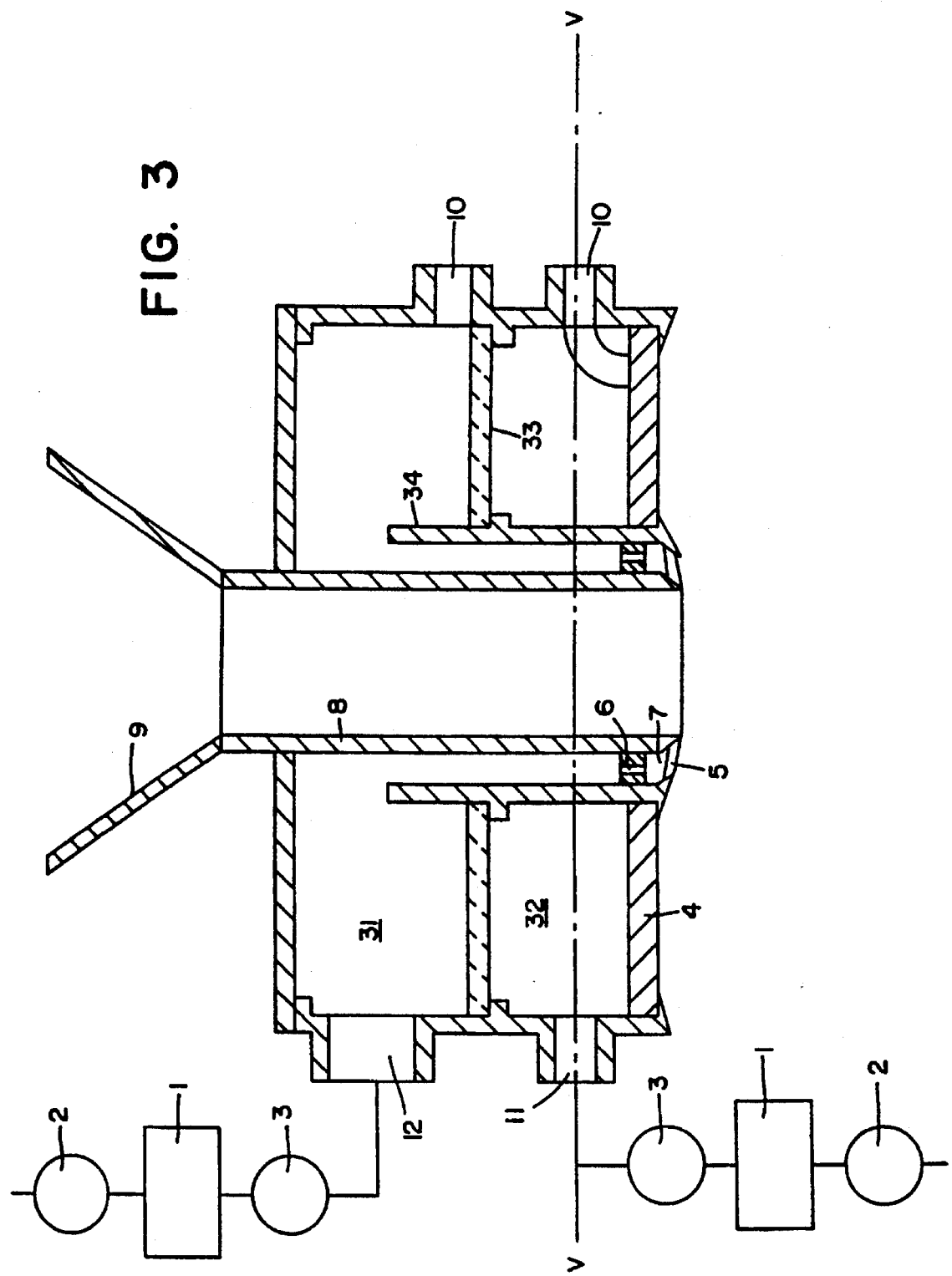
FIG. 3 is a diagrammatic partial elevation in cross-section of the apparatus shown in FIG. 1.
Figure 4:
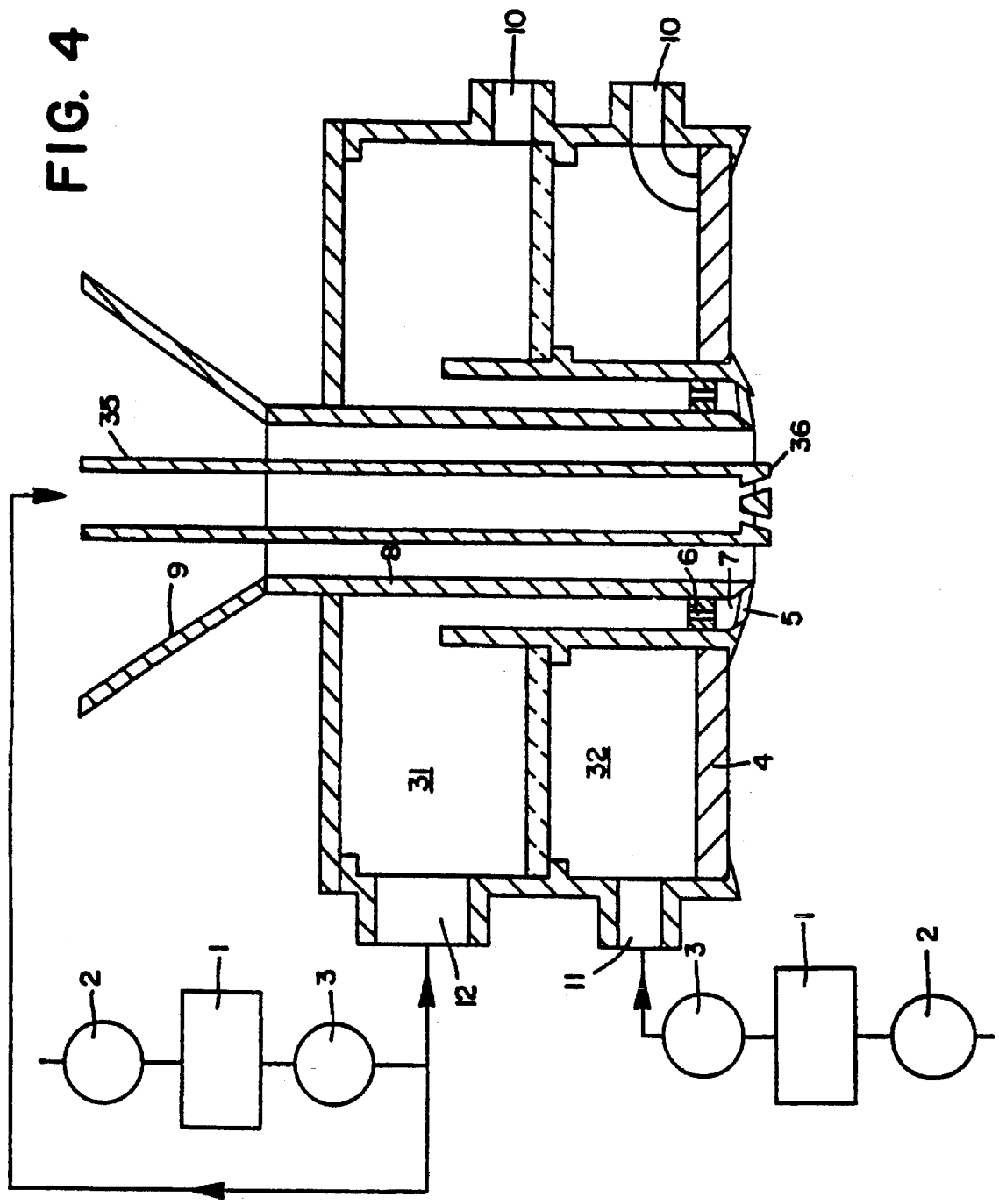
FIG. 4 is a diagrammatic partial elevation in cross-section of a second embodiment of the apparatus.
Figure 5:
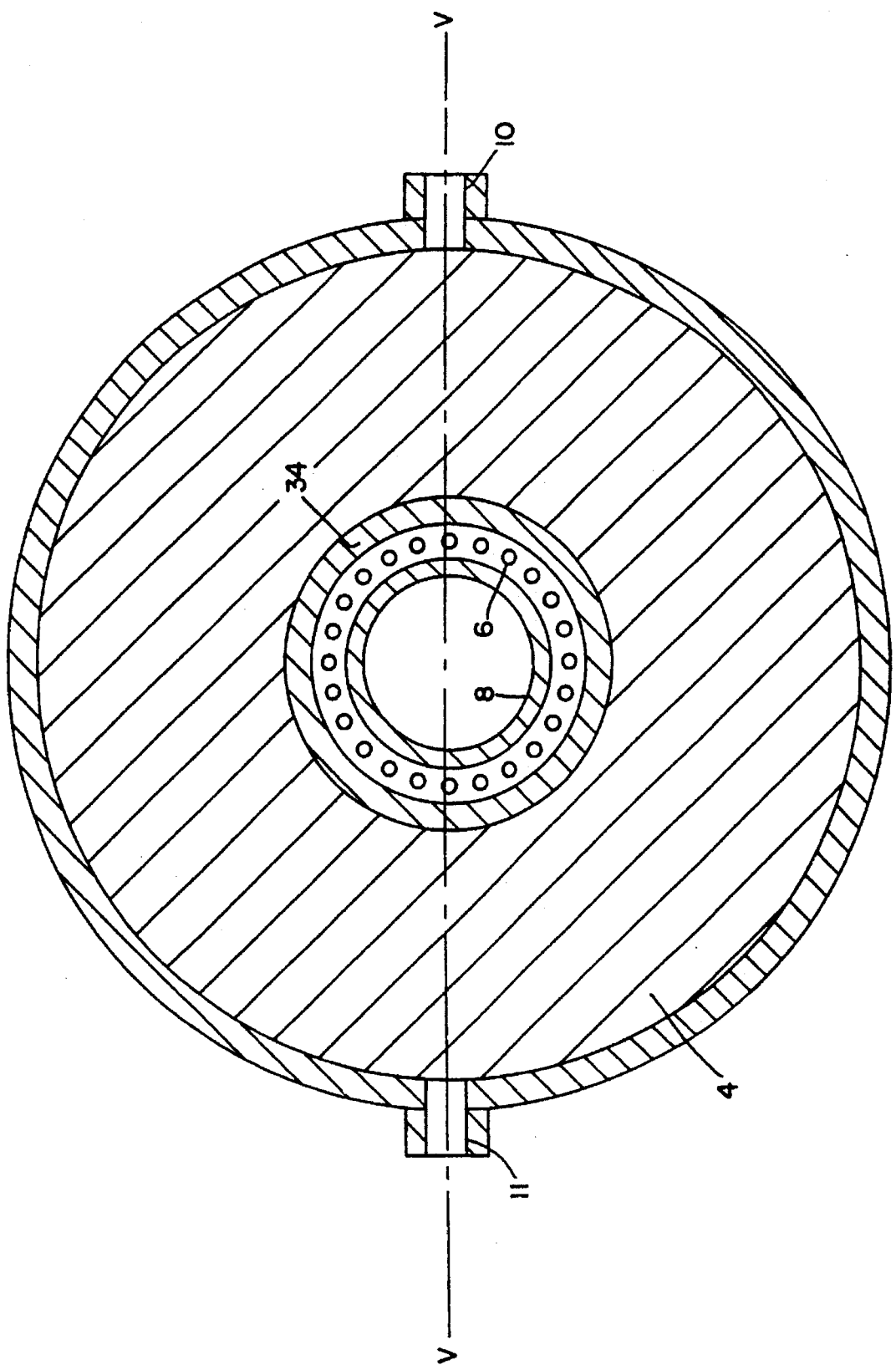
FIG. 5 is a cross-section on the line V—V of FIG. 3.

The nozzle 13 illustrated in FIGS. 3, 4 and 5, as may be gathered from the description above, comprises, in its broadest embodiment, a cylindrical tube (8) for feeding a powder-form material therethrough, to provide a flow of material, and a sintered plate (4) which surrounds the tube and extends transversely from the feed tube with respect to a longitudinal axis of the feed tube at a position adjacent to an end of the feed tube and which is separated from the feed tube by a gap (5) positioned between an outer wall of the feed tube and an inner edge of the plate. As disclosed above, the plate (4) and gap (5) may be constructed integrally with a one-portion compartment or a two-portion compartment which surrounds the feed tube for assisting supply and control of gas to the plate and gap.

As illustrated in FIGS. 3–5, a second tube (34) is positioned coaxially about feed tube (8) and extends from the gap about the feed tube to form a slot between the two tubes which communicates with gap (5), and as illustrated in FIGS. 3 and 4, edges defining the gap may be beveled to direct the flow, which as shown, provides for a gas flow in a direction at an angle towards the longitudinal axis of the feed tube. As also illustrated, a ring with apertured bores may be positioned in the gap (5) (see FIG. 5, in particular).

In the two-portion compartment embodiment, as illustrated, one compartment provides for feeding gas to the gap (5), or slot and gap, and one compartment provides for feeding gas to the sintered plate which then issues from the plate. As illustrated, the compartment is divided into two portions by a plate (33) positioned transversely with respect to the longitudinal axis of the feed tube, the inlets (11) and (12) and condensate outlets (10) are provided for each compartment portion, the operation of which are discussed further below.

A further embodiment illustrated in FIG. 4, includes a further tube centrally disposed within the feed tube (8) which may be employed for supplying a jet of steam. The outlet may have opening (36) to direct the flow, and as illustrated, the outlet of the additional tube is positioned adjacent the outlet of the feed tube and is beveled to direct the flow at an angle away from a longitudinal axis of tube (35).

Figure 1:
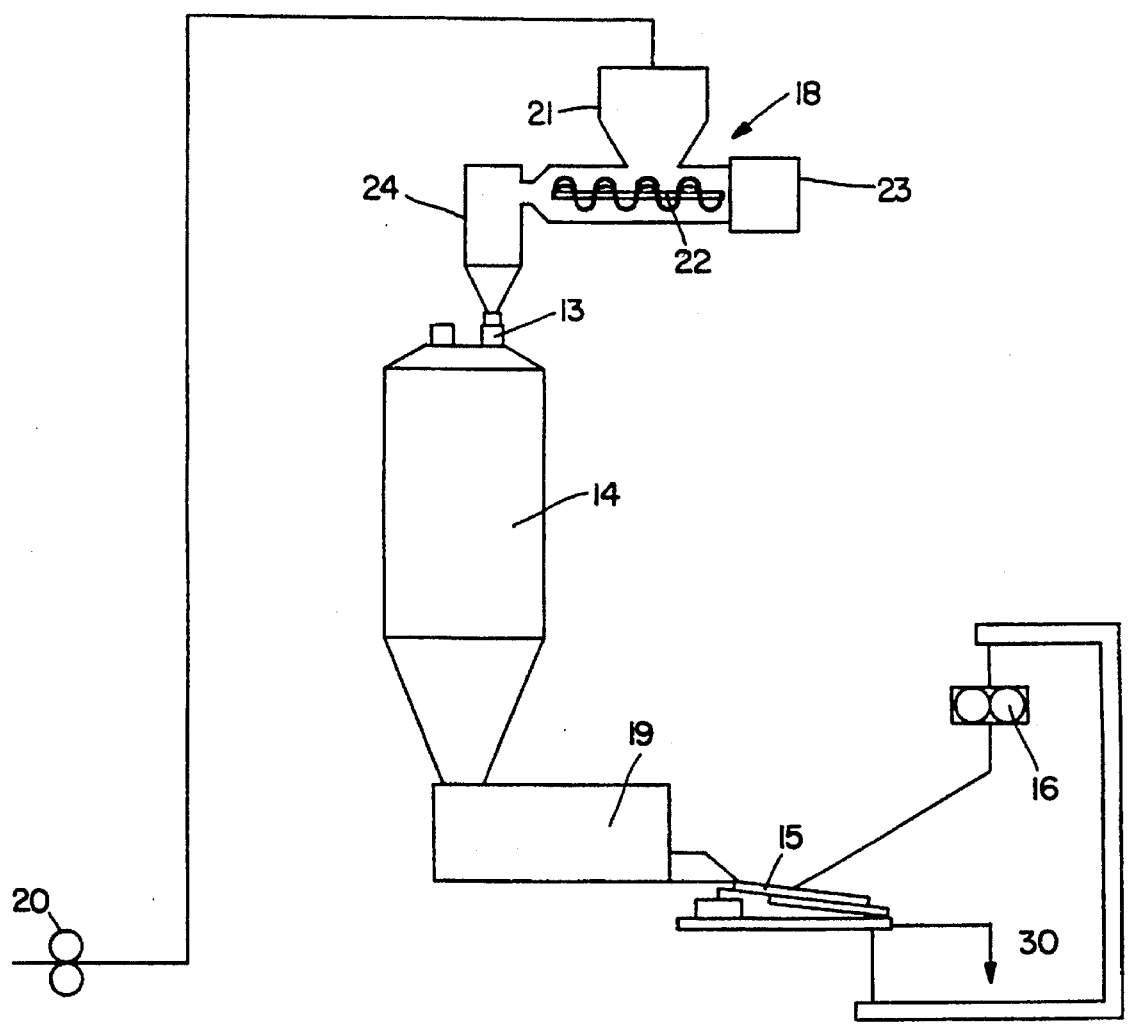
FIG. 1 diagrammatically illustrates an apparatus used for agglomeration.

FIG. 1 illustrates an apparatus suitable for agglomerating a cocoa-containing beverage powder.

A mixture of components is transported to the powder feed (18) by means of a transport system (20). The powder feed (18) consists of a buffer container (21), a metering screw (22), a drive motor (23) and a feed hopper (24). From here, the nozzle (13) is uniformly supplied with powder. In the drying tower (14), the liquid bridges formed between the particles are strengthened by crystallization to such a extent that they no longer disintegrate in the fluidized bed of the dryer (19). The sieve (15) removes oversize particles which are returned via a mill (16) and the end product (30) passes to the filling station.

Figure 2:
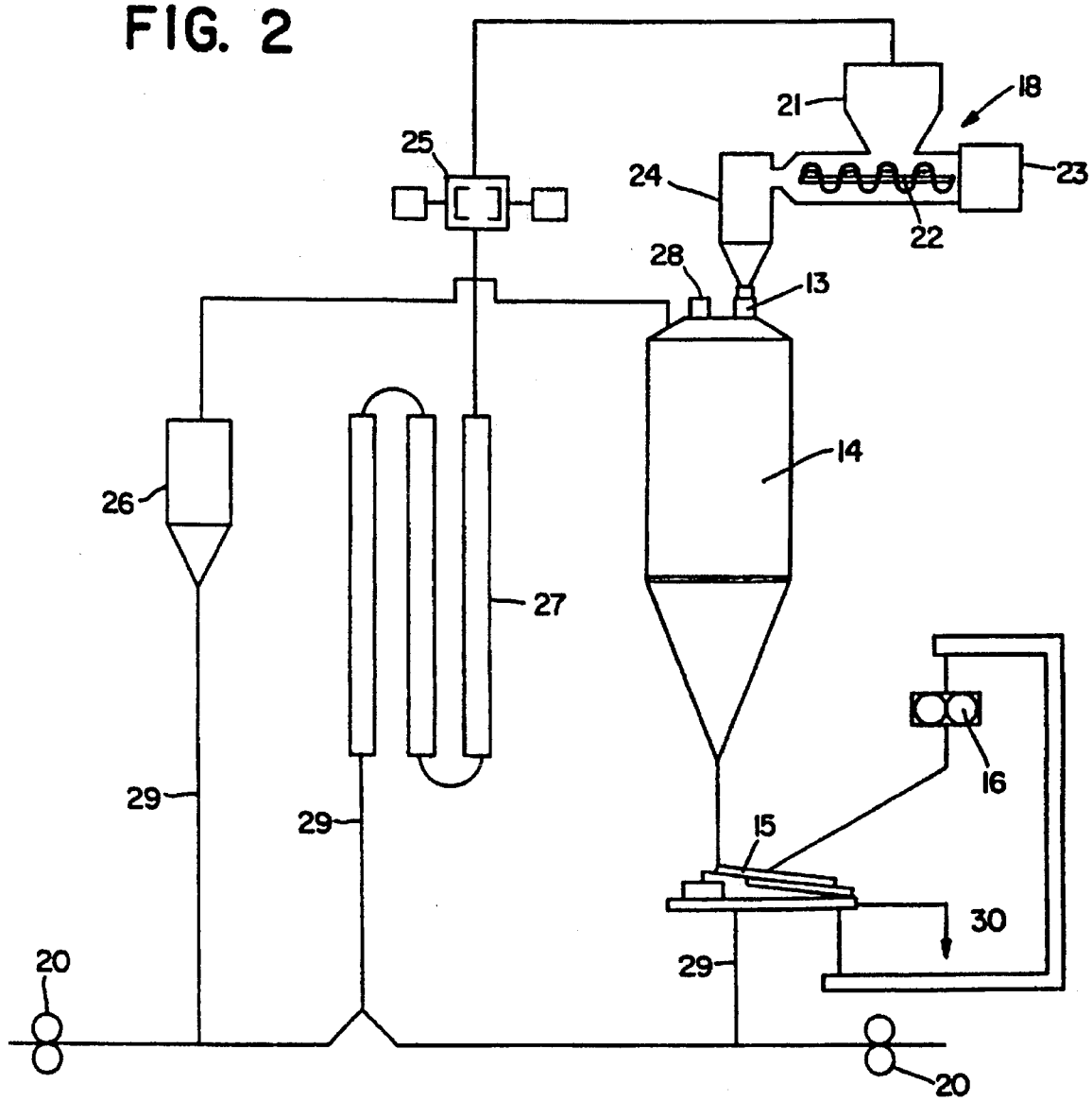
FIG. 2 diagrammatically illustrates an apparatus for spray-drying and agglomeration.

FIG. 2 illustrates an apparatus suitable for agglomerating and spray drying an instant coffee.

An extract (28) sprayed in parallel to the stream of hot air dries in the drying tower (14) before reaching the sieve (15). From the sieve (15) and waste-air dust separator (26), the fine particles (29) are collected via the transport system (20), cooled by the heat exchanger (27) and size-reduced in the mill (25). The product passes through the powder feed (18) to the nozzle (13). The powder feed (18) consists of a buffer container (21), a metering screw (22), a drive motor (23) and a feed hopper (24). After passing through the nozzle (13), the powder wetted with steam enters the integrated drying tower (14) where it dries simultaneously with the extract (28) sprayed in. The sieve (15) removes oversize particles which are returned via a mill (16) and the end product (30) passes to the filling station.

The operation of the nozzle is described below with reference to FIGS. 3–5.

The product passes through the hopper (9) into the powder tube (8). After a mass flow measurement (2), the steam flows through a saturation and superheating unit (1). Temperature and pressure are measured in (3). The split steam compartment (31) is charged in the inlet (12). From there, the steam issues from the gap (5) through a ring with bores (6). Baffle plates (7) determine the direction of flow of the steam. The steam is correspondingly conditioned for the sintered metal plate (4). It passes through the inlet (11) into the sintered metal steam compartment (32) which is separated from the split steam compartment (31) by the intermediate plate (33) and the split tube (34). The steam issues from the sintered metal plate (4) at low velocity coaxially about the particulate material flow, which extends and travels in a direction along a longitudinal axis, and in the direction of the longitudinal extent of the particulate material flow with a very fine mist of droplets. Condensate accumulating in the two compartments (31,32) is removed therefrom through the condensate outlets (10).

FIG. 4 corresponds to the description of FIG. 3 and shows only the additional possibility of applying a central steam jet. It is introduced through a tube (35). The exit velocity is variable through the central nozzle opening (36).

EXAMPLE

For a feed rate of 1 tonne powder per hour, the inner jet comprises 25 kg/h steam at 1.3 bar. The exit velocity is approximately 100 m/s and the temperature 110° C. For the split ring (5), the quantity of steam is 60 kg/h at 1.1 bar, 105° C. and 30 m/s. The coaxial outer stream (sintered metal plate) comprises 100 kg steam/h at 1.15 bar, 102° C. and 7 m/s. The issuing powder jet remains unaffected by inflowing secondary air eddies for at least 1 m.

We claim:

1. A process for agglomerating a particulate material comprising:

feeding a powder-form material to obtain a particulate material flow which extends and travels in a direction along a longitudinal axis, feeding steam through a sintered plate so that a flow of steam issues from the plate coaxially about the particulate material flow and in the direction of the longitudinal travel of the particulate flow and feeding a flow of a gas coaxially about and positioned between the particulate material flow and the steam flow so that the particulate material is contacted with steam to wet and agglomerate the particulate material of the particulate material flow.

2. A process according to claim 1 further comprising feeding an additional steam flow and feeding the particulate material flow so that the particulate material flow is coaxial with about the additional steam flow.

3. A process according to claim 1 or 2 wherein the gas flow is a plurality of gas flow streams coaxially about and positioned between the particulate material flow and the steam flow.

4. A process according to claim 1 or 2 wherein the gas is steam.

5. A process according to claim 1 or 2 wherein the gas is air.

6. A process according to claim 1 or 2 wherein the gas has a flow rate which is greater than a flow rate of the steam issuing from the sintered plate.

7. A process according to claim 1 or 2 wherein the gas flow rate is between 1 and 8 times the steam flow rate issuing from the sintered plate.

8. A process according to claim 1 or 2 wherein the gas has a flow rate of from 20 m/s to 30 m/s and the steam issuing from the sintered plate has a flow rate of up to 10 m/s.

9. A process according to claim 2 wherein the gas has a flow rate of from 20 m/s to 30 m/s, the steam issuing from the sintered plate has a flow rate of up to 10 m/s and the additional steam has a flow rate of from 20 m/s to 100 m/s.

10. A process according to claim 1 or 2 wherein a cross-section of the gas flow is thinner than a cross-section of the steam flow issuing from the sintered plate.

11. A process according to claim 1 or 2 wherein the gas flow issues at an angle directed towards the powder-form material flow.

12. A process according to claim 2 wherein the gas flow and additional steam flow each issue at an angle directed towards the powder-form material flow.

13. A process according to claim 1 or 2 wherein the gas flow has a rotational vector.

14. A process according to claim 1 or 2 wherein the steam fed to the plate has a temperature of from 100° C. to 130° C. and is under a pressure of from 1 bar to 1.5 bar and issues from plate pores having an average diameter of from 10 µm to 200 µm.

15. A process according to claim 1 wherein the powder-form material is selected from the group consisting of soluble coffee, soluble tea, soluble chicory, soluble cereal extract, milk powder, lactose, cocoa-containing powder and other beverage bases based on carbohydrates for preparation of a beverage and combinations thereof.

16. A process according to claim 1 wherein the powder-form material comprises soluble coffee.

17. A process according to claim 1 wherein the powder-form material comprises a cocoa-containing powder for preparing a beverage.

* * * * *